United States Patent

Shikano et al.

[54] TRAVEL-LIMIT CIRCUIT HAVING A DIRECT CURRENT MOTOR FOR A LENS

[75] Inventors: Toru Shikano; Masayuki Arai, both of Tokyo, Japan

[73] Assignee: Asahi Seimitsu Kabushiki Kaisha, Tokyo, Japan

[21] Appl. No.: 09/218,461

[22] Filed: Dec. 22, 1998

[30] Foreign Application Priority Data

Feb. 27, 1998 [JP] Japan .................................. 10-047360

[51] Int. Cl.⁷ .................................................. G05B 5/00
[52] U.S. Cl. ...................... 318/468; 318/294; 318/466; 318/280; 318/293; 318/379
[58] Field of Search ........................... 358/227; 318/379, 318/293, 280, 466, 468, 294

[56] References Cited

U.S. PATENT DOCUMENTS 4,319,171  3/1982  Motoori .................................. 318/379
4,977,457  12/1990  Tamekuni et al. ....................... 358/227

FOREIGN PATENT DOCUMENTS

| 4040460 | 7/1992 | Germany . |
| 57-79925 | 5/1982 | Japan . |
| 64-87982 | 4/1989 | Japan . |
| 2042387 | 9/1980 | United Kingdom . |
| 279786 | 8/1988 | United Kingdom . |
| 2246035 | 1/1992 | United Kingdom . |

OTHER PUBLICATIONS

PAJ Abstract and JP 570079925 (Canon).
PAJ Abstract and JP 010087982 (Matsushita.

*Primary Examiner*—Karen Masih
*Attorney, Agent, or Firm*—Greenblum & Bernstein, P.L.C.

[57] ABSTRACT

A travel-limit circuit having a DC motor for a lens by which the endurance of the motor can be improved while at the same reducing the rebound due to the inertia of the moving body at a travel extremity. The travel-limit circuit has a lens motor that drives, e.g., zoom lens groups. Limits which detect whether the lens group has reached their travel extremities at which mechanical stoppers are provided. The motor driving circuit, which drives the lens motor and the limit switches, activates a short break by short circuiting the pair of input terminals on the lens motor via diodes while cutting current flow from the motor driving circuit for the lens motor upon detection that the lens groups have reached their travel limit.

16 Claims, 3 Drawing Sheets

Intermediate Position

Telephoto Extremity State

Wide-angle Extremity State

PRIOR ART FIG. 5
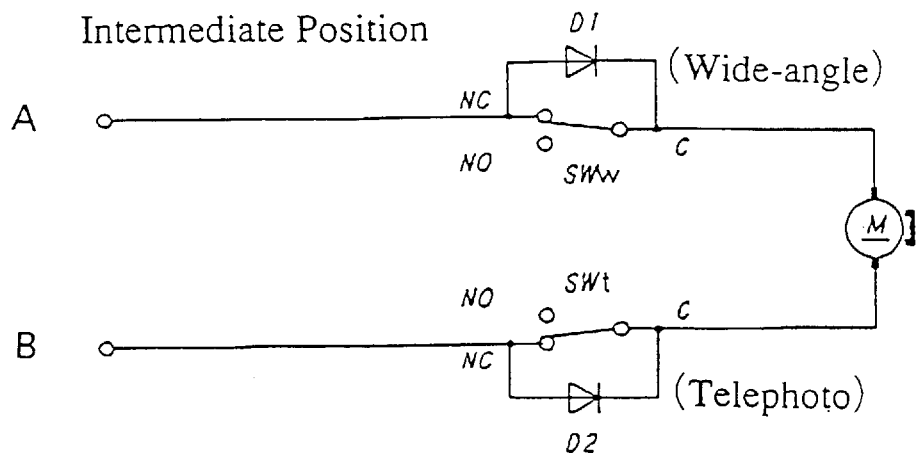
Intermediate Position
PRIOR ART FIG. 6
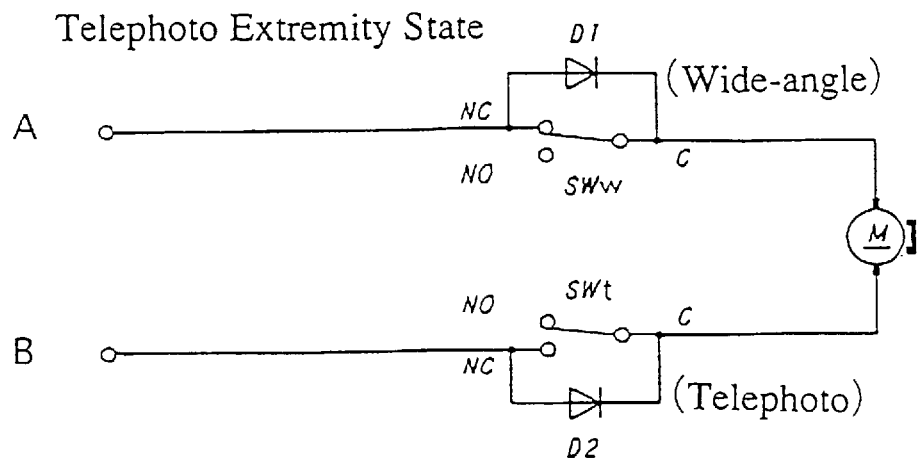
Telephoto Extremity State
PRIOR ART FIG. 7
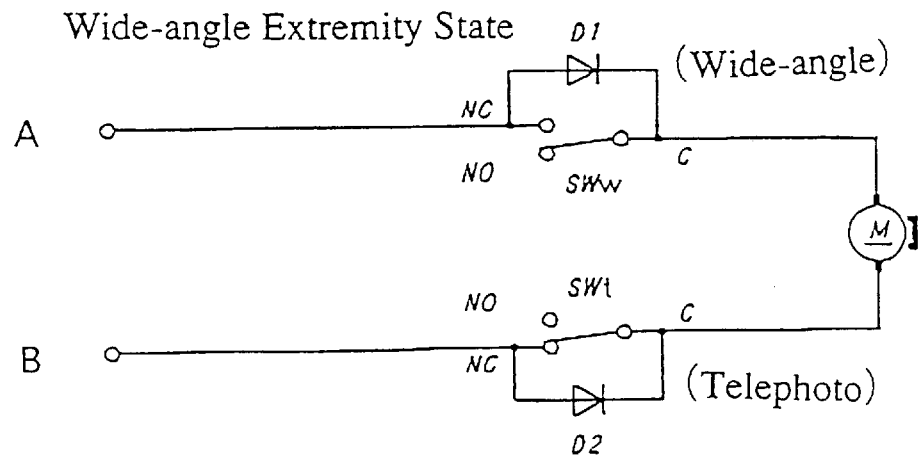
Wide-angle Extremity State

TRAVEL-LIMIT CIRCUIT HAVING A DIRECT CURRENT MOTOR FOR A LENS

FIELD OF THE INVENTION

The present invention relates to a travel-point limit circuit with a direct current motor for a lens, and in particular, relates to a circuit which applies to drivers such as for zooming or focusing lenses, or driving an iris.

BACKGROUND OF THE INVENTION

Hitherto, when D.C. (direct current) motors are employed for zooming or focusing lenses or driving an iris in CCTV cameras, if, for example, in a zooming operation wherein a mechanical stopper is installed so that a zoom lens group may move to a telephoto extremity or a wide-angle extremity, a mechanical torque limiter and a friction clutch are installed in order to protect the direct current motor; and a current limit circuit by means of a micro-switch or the like is installed for the purpose of protecting the driving circuit of the direct current motor.

In FIGS. 5, 6, and 7, a simplified wiring diagrams for the driving circuit for a conventional CCTV motorized zoom lens of the prior art are illustrated.

The embodiment of the prior art constitutes a zoom mechanism which is driven via a lens motor; wherein the lens motor is a D.C. motor. The power terminals A and B are connected to a pair of input terminals of the D.C. motor via the wide-angle limit-switch SWw and the telephoto limit-switch SWt, respectively. The wide-angle limit-switch SWw is a current-breaker micro-switch which detects when the zoom lens group has reached the wide-angle extremity. Similarly, the telephoto limit-switch SWt is a current-breaker micro-switch which detects when the zoom lens group has reached the telephoto extremity. In each limit-switch, there is connected in parallel a 'reverse' current protector diode (D1 and D2), namely, limit-switches SWw and SWt by-pass the normal close terminal NC and common terminal C via diodes D1 and D2 from power terminals A and B in a 'forward' direction.

When the zoom lens group has not arrived at either the telephoto end or the wide-angle end, that is, when the zoom lens is at an intermediate focus position between the telephoto end and the wide-angle end, both of the limit switches SWw and SWt are ON (see FIG. 5). Namely, both of the power terminals A and B are connected to an input terminal of lens motor M via limit switches SWw and SWt. Accordingly, as current can flow in any direction from power terminals A and B in response to the polarity of the voltage applied to power terminals A and B, it is also possible for the lens motor M to rotate in any direction.

The relationship between the voltage at the power terminals and the rotational direction of the lens motor M at an intermediate position, in the above mentioned circumstances, is shown in the following table.

TABLE 1

| Voltage at Power Terminal A | Voltage at Power Terminal B | Rotational Direction of Lens Motor |
|---|---|---|
| + | 0 | Telephoto Direction |
| 0 | + | Wide-angle Direction |

The lens motor M in the conventional example, as shown in FIGS. 5, 6 and 7, rotates in the telephoto direction when the power terminal A is positive, that is, when the current flows from the terminal A to the terminal B; and rotates in the wide-angle direction when the power terminal B is positive, that is, when the current flows from terminal B to terminal A.

If the lens motor M is rotated in the telephoto direction by means of flowing current from terminal A to terminal B, the limit switch SWt at the telephoto extremity is OFF when the zoom lens reaches the telephoto extremity (see FIG. 6).

The relationship between the voltage at the power terminals and the rotational direction of the lens motor M at a telephoto extremity is shown in the following table.

TABLE 2

| Voltage at Power Terminal A | Voltage at Power Terminal B | Rotational Direction of Lens Motor |
|---|---|---|
| + | 0 | Stopped |
| 0 | + | Wide-angle Direction |

When the limit switch SWt at the telephoto extremity is OFF, the current does not flow from terminal A in the direction of the lens motor M. Namely, the driving current toward the telephoto direction is cut and, as a result, the lens motor M is stopped. However, as the current flows from the power terminal B through the lens motor M in the direction of the power terminal A via diode D2, zooming in the direction of the wide-angle becomes possible.

When the lens motor M is rotated in the wide-angle direction by flowing current in the direction from terminal B to terminal A, the limit switch SWw at the wide-angle is OFF when the zoom lens arrives at the wide-angle extremity (see FIG. 7). The relationship between the voltage at the power terminals and the rotational direction of the lens motor M at a wide-angle extremity is shown in the following table.

TABLE 3

| Voltage at Power Terminal A | Voltage at Power Terminal B | Rotational Direction of Lens Motor |
|---|---|---|
| + | 0 | Telephoto Direction |
| 0 | + | Stopped |

When the limit switch SWw at the wide-angle side is OFF, current cannot flow from terminal B to terminal A. Namely, the driving current at the wide-angle direction is cut, and as a result, the lens motor M stops. However, as current flows from terminal A through the lens motor M in the direction of terminal B via the diode D1, zooming in the direction of the telephoto is still possible.

However, in a movable body such as a zoom lens group, the faster the travel speed, the more inertia is incurred. Upon collision of the moving body with a mechanical end-stopper, an extremely large amount of force is exerted on the drive components and on the drive shaft of the D.C. motor. Not only are there problems of durability, the problem of the moving body rebounding in the opposite direction also becomes an issue.

Moreover, if a mechanical switch such as a micro-switch is employed as a limit-switch for a zoom lens, there is a problem with the rebound force further increasing upon contact due to the influence of the spring and actuator. In the prior art, various components have to be strengthened in order to allow a high travel speed of a moving body such as a zoom lens.

In view of the problems mentioned concerning the driving of a conventional CCTV motorized zoom lens, it is an object of the present invention to provide a limit circuit for a D.C. motor having a reduction in rebounding, caused by the inertia of the moving body, and an increased durability thereof.

SUMMARY OF THE INVENTION

To achieve the above-mentioned object, according to the present invention, there is provided a travel-limit circuit having a D.C. motor for a lens composing of: a D.C. motor for driving a movable body, a travel-limit detecting device for detecting when the movable body has reached the mechanical travel-limit thereof, and a driving device for driving the D.C. motor. Upon the detection of a travel limit, the travel-limit detection device cuts the power from the D.C. motor (to the driving device) by short-circuiting the pair of input terminals of the D.C. motor.

Preferably, a stopper member is provided to stop the movable body at the mechanical travel-limit.

Preferably, at least one micro-switch is provided which changes the connection of one of the power terminals and one of the input terminals of the D.C. motor to the connection of one of the input terminals to the other input terminal of the D.C. motor when the travel-limit detection device detects a travel extremity.

Preferably, at least one diode is provided within the circuit, extending from one of the input terminals of the D.C. motor, which changes the induced electromotive force via the micro-switch to a 'forward' direction when the rotational direction of the D.C. motor is toward a travel extremity.

Preferably, at least one micro-switch and at least one diode are installed between one power terminal and one input terminal and are installed between the other power terminal and the other input terminal.

The lens can be a zoom lens; the movable body being a zoom lens group.

Alternatively, the movable body can be a lens group for focus adjustment.

Alternatively, the movable body can be an iris for opening and closing the iris automatically.

The present disclosure relates to subject matter contained in Japanese Patent Application No. 10-47360 (filed on Feb. 27, 1998) which is expressly incorporated herein by reference in its entirety.

BRIEF DESCRIPTION OF THE DRAWINGS

The invention will be discussed below in detail with reference to the accompanying drawings, in which:

FIG. 5 is a diagram illustrating the limit circuit of a conventional power zoom lens;

FIG. 6 is a diagram illustrating the state at telephoto end in the conventional limit circuit of FIG. 5; and FIG. 7 is a diagram illustrating the state at wide-angle end in the conventional limit circuit of FIG. 6.

DETAILED DESCRIPTION OF THE INVENTION

Figures from 1 to 3 are diagrams illustrating the embodiment of the driving circuit in a zoom lens applied to the present invention. This embodiment includes a limit-switch of which a micro-switch having a normal-close terminal and normal-open terminal switching mechanism is employed; so that upon the zoom lens in FIG. 4 reaching either the wide-angle or telephoto extremity, power is cut to the D.C. motor, a short brake is activated, and rebounding is prevented.

Figure 4:
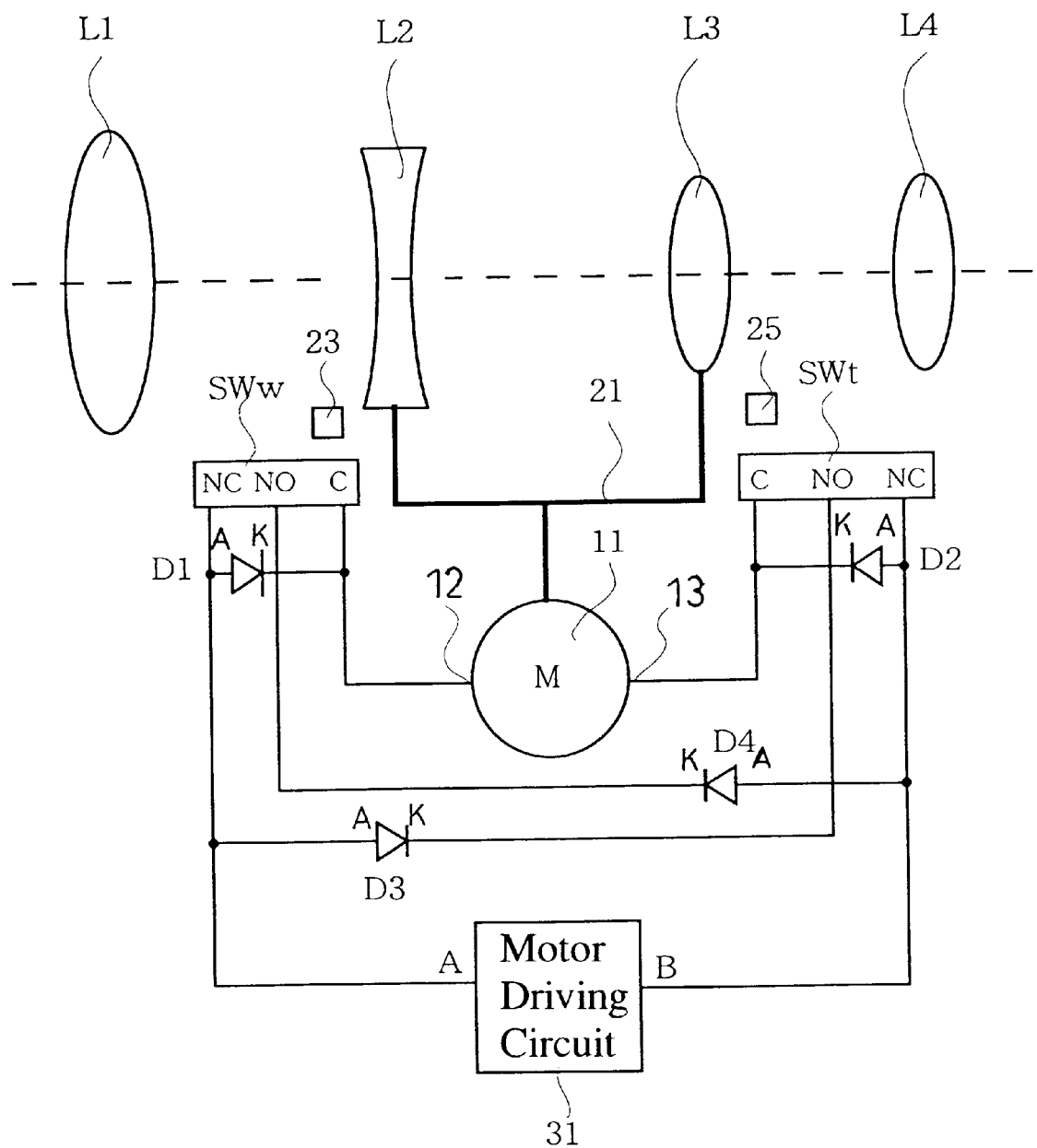
FIG. 4 is a diagram illustrating an outline of the embodiment in which the same limit circuit at the end point was applied to a zoom lens.

FIG. 4 is a simplified diagram of the limit circuit for a CCTV motorized zoom lens according to the embodiment of the present invention. The lens motor 11 (D.C. motor) drives a known zoom mechanism 21 which moves lens groups L2 and L3. The zoom lens has a focusing lens group L1, movable lens groups L2 and L3, and a master lens group L4; and zooming is performed by altering the relative distance between the lens groups L2 and L3.

When the lens groups L2 and L3 are moved so as to approach the focusing lens L1, the focal distance shortens, that is, a wide-angle zooming operation is performed; when the lens groups L2 and L3 are moved away from the focusing lens L1, the focal distance lengthens, that is, a telephoto zooming operation is performed.

The wide-angle zoom stopper 23 of FIG. 4 prevents the movement of the lens groups L2 and L3 in the wide-angle zooming direction; the telephoto zoom stopper 25 (also of FIG. 4) prevents the movement of the lens groups L2 and L3 in the telephoto zooming direction.

Power terminals A and B in the motor driving circuit 31 and input terminals 12 and 13 are connected via the limit switch SWw at the wide angle extremity and the limit switch SWt at the telephoto extremity, respectively; the switches SWw and SWt are usually closed. The limit switch SWw at the wide-angle end is a micro switch which can detect whether the zoom lens groups L2 and L3 have reached the wide-angle extremity, activates a short break to the lens motor 11 and cuts the power supply. Similarly, the limit switch SWt at the telephoto end is a micro switch which can detect whether the zoom lens groups L2 and L3 have reached the telephoto extremity, activates a short brake to the lens motor 11 and cuts the power supply.

Figure 1:
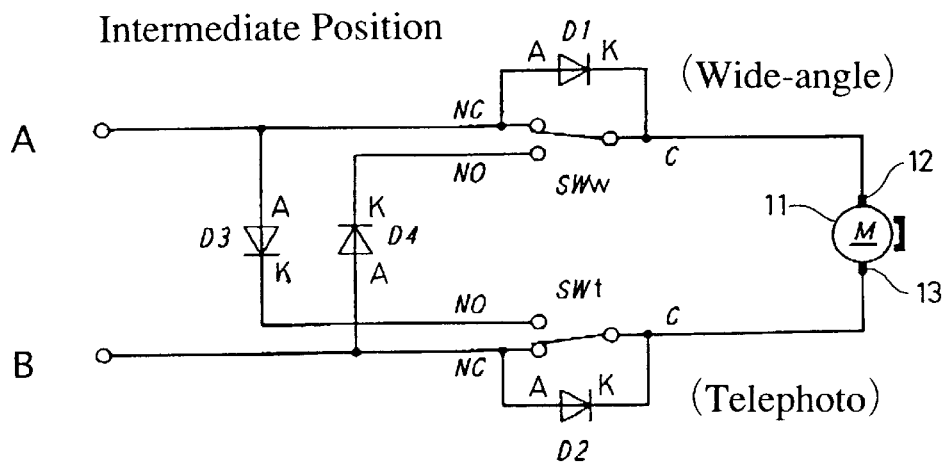
FIG. 1 is a diagram illustrating the embodiment of the limit circuit of the power zoom lens according to the present invention.

As shown in FIG. 1, each limit switch SWw and SWt at the wide-angle end and at the telephoto end, is usually closed, which is usually connected to the normal close terminal NC and the common terminal C. When the lens groups L2 and L3 reach the wide-angle extremity, the wide-angle switch SWw, connected to the common terminal C, switches from the normal close terminal NC to the normal open terminal NO. Similarly, when the lens groups L2 and L3 reach the telephoto extremity, the telephoto switch SWt, connected to the common terminal C, switches from the normal close terminal NC to the normal open terminal NO.

The wide-angle and telephoto limit-switches (SWw and SWt) are connected in parallel with diodes D1 and D2, respectively. More specifically, the normal close terminal NC and the common terminal C of the wide-angle and telephoto limit-switches (SWw and SWt) are by-passed via the diodes D1 and D2 which allow the reversing of the current flow from the input terminals of the lens motor 11, wherein the standard (forward) direction of current flow is from power terminals A and B to the input terminals 12 and 13 of the lens motor, respectively.

Moreover, diode D4 allows the path from terminal B to input terminal 13 to be by-passed to terminal 12 via the normal open terminal NO of limit-switch SWw. Similarly, diode D3 allows the path from terminal A to input terminal 12 to be by-passed to terminal 13 via the normal open terminal NO of limit-switch Swt.

Furthermore, as known, limit-switches SWw and SWt are installed in order to detect the wide-angle and telephoto extremities of the lens groups L2 and L3, and voltage is applied to power terminals A and B via a known motor drive-circuit 31.

The embodiment according to the present invention operates as follows:

Either of the wide-angle and telephoto limit-switches SWw or SWt of FIG. 1, when either switch is switched to the normal close NC terminals (when the movable lens groups L2 and L3 are at an intermediate position), can cause the lens motor 11 to rotate in the wide-angle or telephoto directions, respectively.

In short, if a positive voltage is applied to power terminal A, the lens motor 11 rotates toward the telephoto direction. Similarly, if a positive voltage is applied to power terminal B, the lens motor 11 rotates toward the wide angle direction.

The relationship between the power terminal voltage and the rotative direction for the lens motor 11 at the above-mentioned intermediate position is as the following Table 4.

TABLE 4

| Voltage at Power Terminal A | Voltage at Power Terminal B | Rotational Direction of Lens Motor |
| --- | --- | --- |
| + | 0 | Telephoto Direction |
| 0 | + | Wide-angle Direction |

Figure 2:
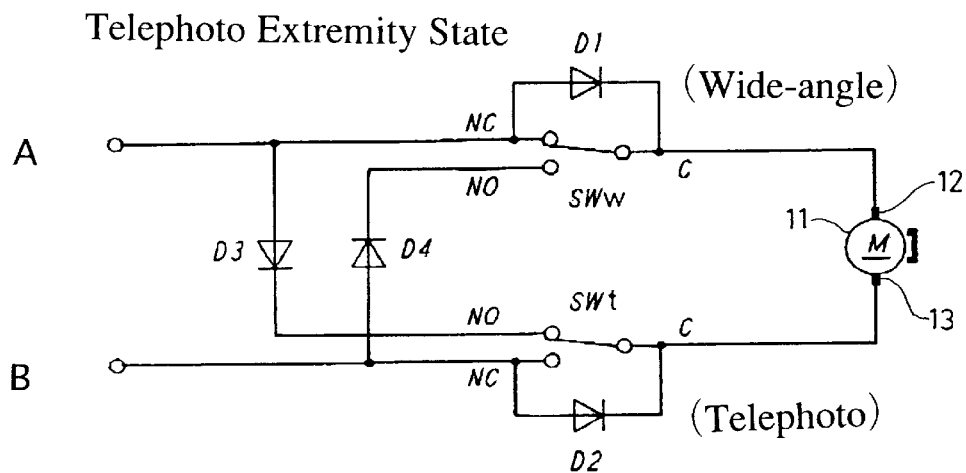
FIG. 2 is a diagram illustrating the state at a telephoto extremity of the limit circuit of FIG. 1.
Figure 3:
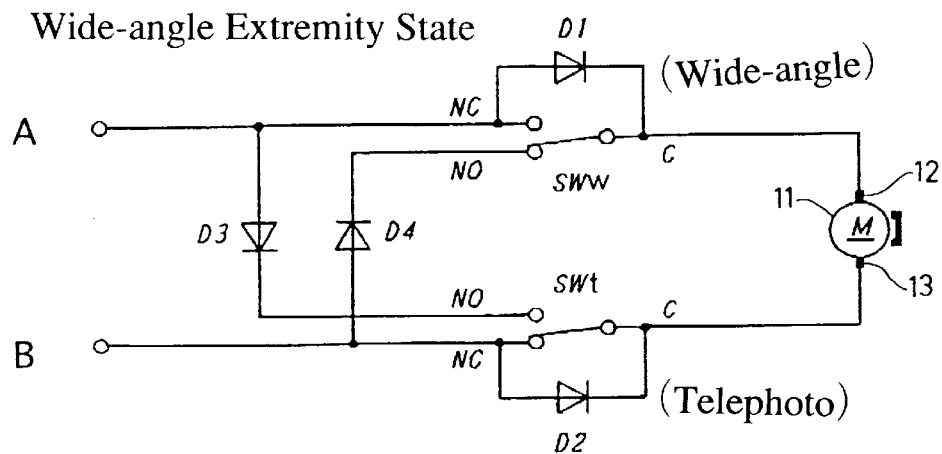
FIG. 3 is a diagram illustrating the state at a wide-angle extremity of the limit circuit of FIG. 1.

If the lens motor 11 for the movable lens is rotated toward the telephoto direction from the intermediate position as shown in FIG. 1 by applying a positive voltage to the power terminal A, the zoom lens group moves to the telephoto direction. If the zoom lens group arrives at the telephoto extremity, the limit switch of SWt at the telephoto end switches from the normal close terminal NC to the normal open terminal NO (FIG. 2). Thereupon, as diode D2 is in the reverse direction in respect to the voltage of power terminal B, the current to the lens motor 11 is broken. Whereas, the telephoto limit-switch SWt allows current to flow to the other input terminal 13 from power terminal A via diode D3.

At this point, if the lens motor 11 tries to rotate further in the telephoto direction due to the force of inertia, since the induced electromotive force of the lens motor 11 will be in a forward direction with respect to the diode D3, the current flows from the input terminal 12 to the other input terminal 13 via the wide-angle limit-switch SWw, diode D3, and telephoto limit-switch SWt, causing a short-brake to occur. Hence, a load is applied in a stopping direction in accordance with the rotative speed of the lens motor 11 which is stopped. Consequently, impact on the stopper 25 at the telephoto end decreases and the rebound of the zoom lens groups L2 and L3 is prevented. In this telephoto extremity state, if a positive voltage is applied to power terminal B, the current flows to the lens motor 11 via diode D2. Therefore, the lens motor 11 rotates in the wide-angle direction.

The relationship between the power terminal voltage in the above-mentioned position of the telephoto end and the rotative direction for the lens motor 11 is shown in the following table.

TABLE 5

| Voltage at Power Terminal A | Voltage at Power Terminal B | Rotational Direction of Lens Motor |
| --- | --- | --- |
| + | 0 | Stopped |
| 0 | + | Wide-angle Direction |

Moreover, if the lens motor 11 is rotated toward the wide-angle direction by applying a positive voltage to the power terminal B at the intermediate position of the moving lens as shown in the FIG. 1 or from the telephoto extremity as shown in the FIG. 2, the zoom lens group moves in the wide-angle direction. Further, if the zoom lens group arrives at the wide-angle extremity, the limit switch of SWw at the wide-angle end switches from the normal close terminal NC to the normal open terminal NO. Thereupon, as diode of D1 is in the reverse direction in respect to the voltage of power terminal A, the current to the lens motor 11 is cut. Whereas, the wide limit-switch SWw allows current to flow to the other input terminal 12 from power terminal B via diode D4.

At this point, if the lens motor 11 tries to rotate further in the wide-angle direction due to the force of inertia, since the induced electromotive force of the lens motor 11 will be in a forward direction with respect to diode D4, the current flows from the input terminal 13 to the other input terminal 12 via the telephoto limit-switch SWt, diode D4, and wide-angle limit-switch SWw, causing a short-brake to occur. Hence, a load is applied to the stopping position in accordance with the rotative speed of the lens motor 11 and the motor stops. Consequently, impact on the stopper 23 at the wide-angle end decreases and the rebound of the zoom lens groups of L2 and L3 is substantially prevented. In this wide-angle state, if a positive voltage is applied to power terminal A, the current flows to the lens motor 11 via diode D1. Therefore, the lens motor 11 rotates in the telephoto direction.

The relationship between the voltage at the power terminals and the rotational direction of the lens motor M at a wide-angle extremity is shown in the following table.

TABLE 6

| Voltage at Power Terminal A | Voltage at Power Terminal B | Rotational Direction of Lens Motor |
| --- | --- | --- |
| + | 0 | Telephoto Direction |
| 0 | + | Stopped |

According to the embodiment of the present invention, if the zoom lens group arrives at the telephoto extremity or at the wide-angle extremity, the limit switch SWt at the telephoto extremity or the limit switch SWw at the wide-angle extremity is activated, and as a result, a short brake is applied to the lens motor 11. Therefore, mechanical endurance can be improved and the prevention of the zoom lens group from rebounding in the opposite direction to the driving direction due to the reaction of the mechanical stop becomes achievable. Furthermore, if the timing of the detection of the limit-switches is set before the collision of either stopper (23 or 25), the endurance factor is effectively improved.

The embodiment of the present invention is that of a limit-circuit for a lens motor that drives a lens group. However, the present invention is not limited to this embodiment and is applicable to motors for driving focusing lens groups, motors used to open and close an iris, or for any device which employs a control mechanism having a travel extremity for a moving body.

As can be understood from the above explanations (and as clearly stated in claim 1) of the present invention, since a short-brake is applied to the D.C. motor and the travel-limit detection device cuts the power thereto when the moving body, driven via the D.C. motor, reaches its travel limit, the induced electromotive force of the D.C. motor acts as an electrical brake. Hence, the D.C. motor and moving body drastically reduces the speed thereof and upon stoppage, collision or rebound is prevented, or at least reduced substantially.

As stated in claims 3 and 4 of the present invention, a micro-switch is provided which changes the connection of one of the power terminals and one of the input terminals of the D.C. motor to the connection of one of the input terminals to the other input terminal of the D.C. motor when the travel-limit detection device detects a travel extremity (end-of-travel). Moreover, since a diode is provided (within the circuit extending from one of the input terminals of the D.C. motor) which changes the induced electromotive force via the micro-switch to a 'forward' direction when the rotational direction of the D.C. motor is toward a travel extremity, a simple travel-limit circuit (having a short-brake) without necessitating a special control circuit can be achieved.

While the invention has been particularly shown and described with reference to a preferred embodiment, it is to be understood that the invention is not limited to the particulars disclosed and extends to all equivalents within the scope of the claims.

What is claimed is:

1. A travel-limit circuit having a D.C. motor for a lens, comprising:
    a D.C. motor having a pair of input terminals, said D.C. motor driving a movable body said movable body being movable between a first mechanical travel-limit and a second mechanical travel-limit; and
    a travel-limit detection device for detecting when said movable body has reached either of said first mechanical travel-limit or said second mechanical travel-limit,
    wherein, upon detection of either said first mechanical travel limit, or said second mechanical travel-limit said travel-limit detection device stops the current to said D.C. motor by short-circuiting the pair of input terminals of said D.C. motor;
    wherein said travel-limit detection device comprises:
        a first micro-switch which changes the connection of one of a pair of power terminals of a D.C. motor driving circuit with one of said pair of input terminals to the connection of said one of said pair of input terminals to the other of said pair of input terminals when said movable body has reached said first mechanical travel limit;
        a second micro-switch which changes the connection of the other of said pair of power terminals of said D.C. motor driving circuit with said other of said pair of input terminals to the connection of said other of said pair of input terminals to said one of said pair of input terminals when said movable body has reached said second mechanical travel-limit;
        a first diode which changes the induced electromotive force of said D.C. motor via said first and second micro-switches to be in a 'forward' direction when the rotational direction of said D.C. motor is toward said first mechanical travel limit;
        a second diode which changes the induced electromotive force of said D.C. motor via said first and second micro-switches to be in a 'forward' direction when the rotational direction of said D.C. motor is toward said second mechanical travel-limit;
        wherein said first micro-switch and said first diode are provided between said other of said pair of power terminals and said one of said pair of input terminals; and
        wherein said second micro-switch and said second diode are provided between said one of said pair of power terminals and said other of said pair of input terminals.

2. A travel-limit circuit having a D.C. motor for a lens according to claim 1, further comprising a stopper member to stop said movable body at one of said first mechanical travel-limit and said second mechanical travel-limit.

3. A travel-limit circuit having a D.C. motor for a lens according to claim 1, wherein said movable body moves back and forth along a path, said first and second micro-switches located at two travel extremities of said path of said movable body, respectively.

4. A travel-limit circuit having a D.C. motor for a lens, comprising:
    a D.C. motor having a pair of input terminals, said D.C. motor driving a movable body back and forth along a path between a first mechanical travel-limit and a second mechanical travel-limit;
    a travel-limit detection device for detecting when said movable body has reached either said first mechanical travel-limit or said second mechanical travel limit, said travel limit detection device comprising two micro-switches located at the two travel extremities of said movable body;
    said micro-switches each comprise a common terminal and two switching terminals, said common terminal being selectively connected to either one of said two switching terminals;
    said common terminal of one of said two micro-switches is connected to one of said pair of input terminals of said D.C. motor;
    said common terminal of the other of said two micro-switches is connected to the other of said pair of input terminals of said D.C. motor;
    a first diode connected between one of said two switching terminals of said one of said two micro-switches and the other of said two switching terminals of said other of said two micro-switches; and
    a second diode connected between one of said two switching terminals of said other of said two micro-switches and the other of said two switching terminals of said one of said two micro-switches,
    wherein, upon detection of either said first mechanical travel limit or said second mechanical travel-limit, said travel-limit detection device stops the current to said D.C. motor by short-circuiting the pair of input terminals of said D.C. motor.

5. A travel-limit circuit having a D.C. motor for a lens according to claim 4, wherein:
    said one of said two switching terminals of said one of said two micro-switches is connected to an anode of said first diode,
    said other of said two switching terminals of said one of said two micro-switches is connected to a cathode of said second diode, said one of said two switching terminals of said other of said two micro-switches is connected to an anode of said second diode, and said other of said two switching terminals of said other of said two micro-switches is connected to a cathode of said first diode.

6. A travel-limit circuit having a D.C. motor for a lens according to claim 5, wherein:

when said movable body arrives at one extremity when said current flows to said D.C. motor to move said movable body in the direction of said one extremity, said one micro-switch switches from said one switching terminal to said other switching terminal thereof, so that said current to said D.C. motor is stopped and at a same time the pair of input terminals of said D.C. motor are short-circuited via said one switching terminal of said other micro-switch, said second diode, and said other switching terminal of said one micro-switch; and when said movable body arrives at the other extremity when said current is flows to said D.C. motor to move said movable body in the direction of said the other extremity, said the other micro-switch switches from said one switching terminal to said other switching terminal thereof, so that said current is cut to said D.C. motor and at the same time the pair of input terminals of said D.C. motor are short-circuited via said one switching terminal of said one micro-switch, said first diode, and said other switching terminal of said other micro-switch.

7. A travel-limit circuit having a D.C. motor for a lens according to claim 5, wherein a third diode is provided between said one switching-terminal and said common terminal of said one micro-switch, wherein an anode of said third diode is connected to said one switching terminal of said one micro-switch, and a cathode of said third diode is connected to said common terminal of said one micro-switch, wherein a fourth diode is provided between said one switching-terminal and said common terminal of said other micro-switch, and wherein an anode of said fourth diode is connected to said one switching terminal of said other micro-switch, and a cathode of said fourth diode is connected to said common terminal of said other micro-switch.

8. A travel-limit circuit having a D.C. motor for a lens according to claim 1, wherein said lens is a zoom lens and wherein said movable body is a zoom lens group.

9. A travel-limit circuit having a D.C. motor for a lens according to claim 1, wherein said movable body is a focus adjustment lens group.

10. A travel-limit circuit having a D.C. motor for a lens according to claim 1, wherein said movable body is an automatically opening and closing iris.

11. A travel-limit circuit having a D.C. motor for a lens according to claim 4, further comprising a stopper member that stops said movable body at one of said first mechanical travel limit and said second mechanical travel limit.

12. The travel-limit circuit having a D.C. motor for a lens according to claim 4, said lens comprising a zoom lens and said movable body comprises a zoom lens group.

13. The travel-limit circuit having a D.C. motor for a lens according to claim 4, wherein said movable body is a focus adjusting lens group.

14. A travel-limit circuit having a D.C. motor for a lens according to claim 1, wherein said movable body is an automatically opening and closing iris.

15. The travel-limit circuit having a D.C. motor for a lens according to claim 1, wherein said first mechanical travel-limit being one of a telephoto extremity and a wide angle extremity of a zoom lens and said second mechanical travel-limit being the other of said telephoto extremity and said wide angle extremity of said zoom lens.

16. The travel-limit circuit having a D.C. motor for a lens according to claim 4, said first mechanical travel limit being one of a telephoto extremity and a wide angle extremity of a zoom lens and said second mechanical travel limit being the other of said telephoto extremity and said wide angle extremity of said zoom lens.

* * * * *

UNITED STATES PATENT AND TRADEMARK OFFICE
CERTIFICATE OF CORRECTION

PATENT NO. : 6,118,242  
DATED : September 12, 2000  
INVENTOR(S) : T. Shikano et al.

Page 1 of 1

It is certified that error appears in the above-identified patent and that said Letters Patent is hereby corrected as shown below:

<u>Column 9,</u>  
Line 20, after "current" delete "is".

Signed and Sealed this

Eighteenth Day of December, 2001

*Attest:*

*Attesting Officer*

JAMES E. ROGAN  
*Director of the United States Patent and Trademark Office*